June 7, 1927.
G. B. ANDERSON
1,631,114
POWER PROPELLED RUNNER ATTACHMENT FOR MOTOR VEHICLES
Filed Nov. 25, 1924
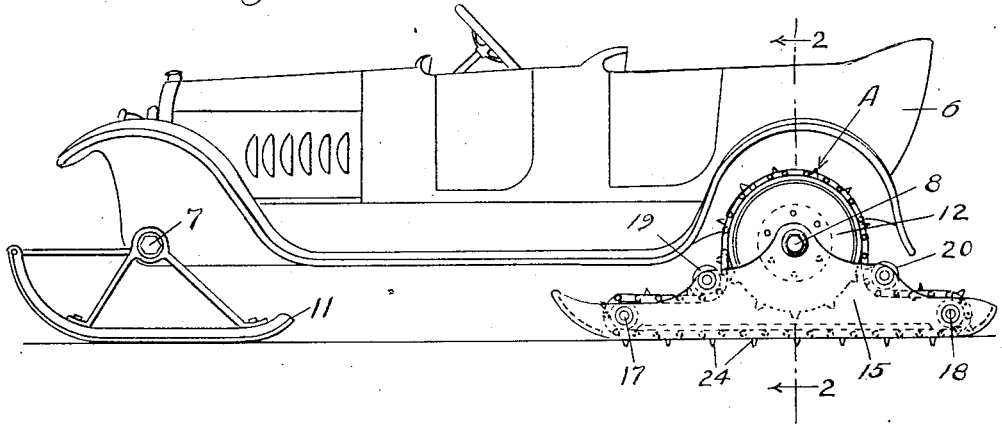
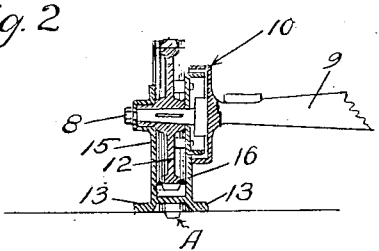
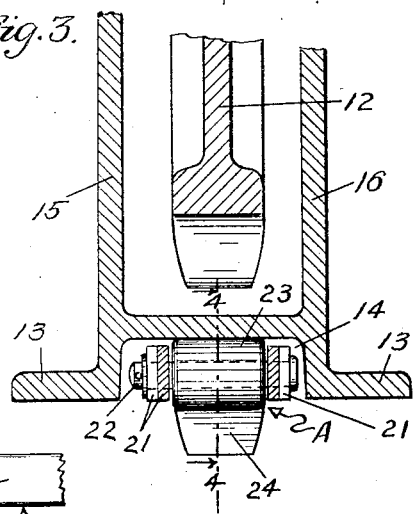
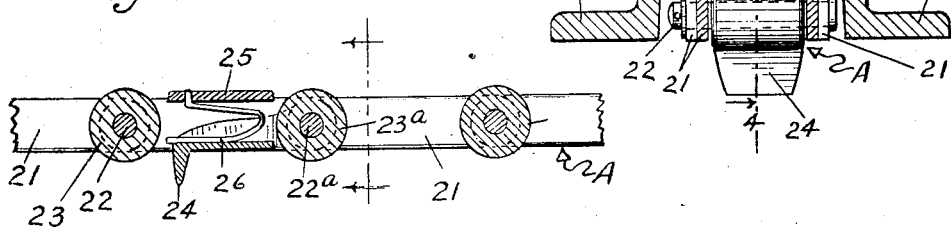
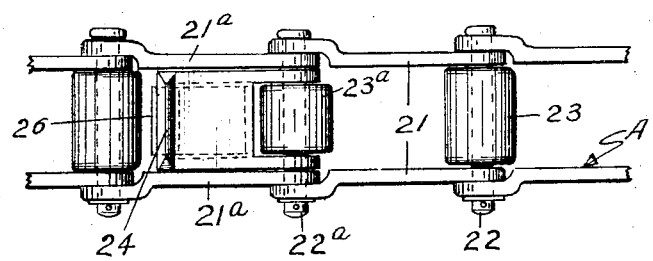
INVENTOR
GUSTAF B. ANDERSON
BY
ATTORNEY Patented June 7, 1927.

1,631,114

UNITED STATES PATENT OFFICE.

GUSTAF B. ANDERSON, OF MINNEAPOLIS, MINNESOTA.

POWER-PROPELLED RUNNER ATTACHMENT FOR MOTOR VEHICLES.

Application filed November 25, 1924. Serial No. 752,097.

This invention relates to runner attachments for motor vehicles and the main object is to provide a simple, practical and efficient substitute for the usual or customary ground wheels, whereby the vehicle will be supported on runners, for snow and ice travel, and whereby the vehicle may be driven, either forwardly or rearwardly, by the customary drive shafts or axles of the car. Further and more specific objects will be disclosed in the course of the following specification, reference being had to the accompanying drawing, wherein:—

Figure 1 is a side elevation of an ordinary automobile as equipped with my improved runner device.

Figure 2 is a sectional elevation as on the line 2—2 in Figure 1.

Figure 3 is an enlarged detail section as shown at the lower end portion of Figure 2.

Figure 4 is a longitudinal sectional detail of a portion of the drive chain, as on the line 4—4 in Figure 3.

Figure 5 is an outer plan view of a section of the chain, as shown in Figure 4.

Referring to the drawings more particularly and by reference characters 6 designates the body of a motor vehicle having a front axle 7, rear axle 8, axle housing 9, and brake 10, all of common and well known construction. The front or steering wheels of the car may be left on, if so desired, but ordinarily they are removed and substituted by relatively short steering runners 11 (see Figure 1).

The rear or drive wheels of the car are removed entirely from the axles 8, to which they are normally keyed, and are substituted by large sprocket gears 12, which are keyed to the drive shafts or axles, so as to be rotated by them. The drum of the brake 10 may be secured to the sprocket wheel 12, as shown in Figure 2.

Each rear runner (two of which are employed) consists of a main body member having a pair of lateral suporting flanges 13, between which is a channel 14 in which is guided the drive chain A. At the front and rear ends of the runner the flanges 13 merge so as to form solid curved surfaces, so the vehicle can be moved either forwardly or rearwardly.

The outer plate 15 of the rear runner extends upwardly to form a bearing for the shaft 8, but is not keyed thereto, with a result that the car will be properly supported from the runner, but the wheel 12 will be free to rotate between the flange 15 and the inner flange 16. A pair of idler pinions or rollers 17 and 18 are mounted at the ends of the runner, to carry the chain A, and a second pair of idler wheels or rollers 19 and 20 are journaled or mounted inwardly from the rollers 17—18, and they act downwardly against the chain and hold it in working contact with more than half of the teeth of the sprocket wheel 12. The chain thus passes over the wheel 12, under the members 19—20, and around the members 17—18.

The chain, as shown in Figures 3, 4, and 5, consists of side bars or links 21, connected by pins 22, on which are mounted rollers 23. These rollers are arranged to roll up against the runner while passing through the channel 14, and thus eliminate friction as far as possible.

The chain A is provided, at intervals, with teeth or lugs 24, for engaging the ground so as to give the chain a traction grip on snow or ice being traveled over. These lugs are yieldingly mounted, however, so that they can retract to some extent when they come in contact with hard ground or ice. The preferred chain and tooth construction, is shown in Figures 4, and 5 and may be described as follows. One pair of links 21$^a$ are solidly connected together by an integral bridge member 25. The tooth member 24 is normally spaced from the member 25, and is held in a yieldingly operative position by a suitable spring 26 which is secured to the members 24 and 25 by welding or other equivalent means. One end of the tooth member is bifurcated, and the two arms are preforated to receive the pin 22$^a$. The roller 23$^a$ is necessarily a little shorter than the other rollers 23. It will thus be seen that although the teeth 26 will be normally held in operative engagement with the ground, whether the vehicle is travelling forward or rearward, they will retract when necessary, and thus not have to support the entire load of the car.

It is understood that various modifications may be made in the general design and structural details of the invention as herein illustrated and described, provided, however, that such modifications come within the spirit and scope of the appended claims.

Having now, therefore, fully shown and described my invention, what I claim to be new and desire to protect by Letters Patent is:—

1. A traction chain for vehicle runner attachments consisting of pivotally connected links, certain of said links comprising side bars connected by an integral cross member, a lug movably secured between the side bars, and a spring arranged between the cross member and lug to press the latter outwardly.

2. A traction chain of the character described consisting of links connected by pivots, certain of said links each comprising a pair of side bars connected by a transverse cross member, a lug arranged between the side bars and carried by one of the link pivots, and a spring arranged between the lug and said cross member.

In testimony whereof I affix my signature.

GUSTAF B. ANDERSON.